United States Patent
Kovie et al.

(10) Patent No.: US 10,940,808 B2
(45) Date of Patent: Mar. 9, 2021

(54) TRIM PANEL MEMBER FOR A VEHICLE

(71) Applicant: Nissan North America, Inc., Franklin, TN (US)

(72) Inventors: David Kovie, Livonia, MI (US); Matthew Mccormick, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 12 days.

(21) Appl. No.: 16/400,779

(22) Filed: May 1, 2019

(65) Prior Publication Data
US 2020/0346592 A1    Nov. 5, 2020

(51) Int. Cl.
| | | |
|---|---|---|
| B60R 13/02 | (2006.01) | |
| B60R 13/04 | (2006.01) | |
| B62D 25/04 | (2006.01) | |
| B62D 25/02 | (2006.01) | |

(52) U.S. Cl.
CPC ........ B60R 13/0206 (2013.01); B60R 13/025 (2013.01); B62D 25/025 (2013.01); B62D 25/04 (2013.01)

(58) Field of Classification Search
CPC ... B60R 13/02; B60R 13/025; B60R 13/0237; B60R 13/026; B62D 25/025
USPC .......................... 296/193.06, 39.1, 1.08, 209
See application file for complete search history.

(56) References Cited

U.S. PATENT DOCUMENTS

| | | | |
|---|---|---|---|
| 8,327,600 B2 | 12/2012 | Stepan | |
| 9,868,470 B2 * | 1/2018 | Emura | B62D 25/04 |
| 2011/0266836 A1 * | 11/2011 | Heo | B62D 21/157 |
| | | | 296/193.06 |
| 2013/0140851 A1 * | 6/2013 | Zornack | B62D 25/04 |
| | | | 296/193.06 |

FOREIGN PATENT DOCUMENTS

JP    3849407 B2    11/2006

OTHER PUBLICATIONS

Volvo 2016 XC90 B-pillar trim panel member, at least as early as Apr. 30, 2019.

* cited by examiner

*Primary Examiner* — Joseph D. Pape
*Assistant Examiner* — Dana D Ivey
(74) *Attorney, Agent, or Firm* — Global IP Counselors, LLP

(57) ABSTRACT

A trim panel member for a vehicle includes a body portion and first and second arm portions connected to the body portion. The body portion is configured to be connected to a first structural member. The first arm portion is connected to the body portion and extends in a first direction from the body portion. The second arm portion is connected to the body portion and extends in a second direction from the body portion. The second body portion is configured to be connected to a second structural member. The second arm portion includes an outboard portion and an inboard portion. The outboard portion has a hook member configured to engage the second structural member. The hook member extends downwardly from the outboard portion. The inboard portion is configured to be spaced from the second structural member when the trim panel member is connected to the vehicle.

20 Claims, 9 Drawing Sheets

TRIM PANEL MEMBER FOR A VEHICLE

BACKGROUND

Field of the Invention

The present invention generally relates to a trim panel member for a vehicle. More specifically, the present invention relates to a trim panel member for a vehicle in which the trim panel member is substantially prevented from movement in an inboard direction and from rotational movement after installation.

Background Information

After installing a trim panel member to the vehicle structure, the installation of additional components can cause movement of the installed trim panel member. The movement of the trim panel member can adversely affect the installation and functionality of the additional components.

SUMMARY

An object of the disclosure is to provide a trim panel member for a vehicle in which the trim panel member is substantially prevented from movement in an inboard direction and from rotational movement after installation.

In view of the state of the known technology, one aspect of the present disclosure is to provide a trim panel member for a vehicle. The trim panel member includes a body portion and first and second arm portions connected to the body portion. The body portion is configured to be connected to a first structural member of the vehicle. The first arm portion is connected to the body portion and extends in a first direction from the body portion. The second arm portion is connected to the body portion and extends in a second direction from the body portion. The second body portion is configured to be connected to a second structural member of the vehicle. The second arm portion includes an outboard portion and an inboard portion. The outboard portion has a hook member configured to engage the second structural member. The hook member extends downwardly from the outboard portion. The inboard portion is configured to be spaced from the second structural member when the trim panel member is connected to the vehicle.

Another aspect of the present invention includes a vehicle body structure including a structural pillar; a sill connected to the structural pillar, and a trim panel member connected to the structural pillar and to the sill. The sill has an opening. The trim panel member includes a body portion connected to the structural pillar, and first and second arm portions connected to the body portion. The first arm portion extends in a first direction from the body portion. The second arm portion extends in a second direction from the body portion. The second body portion is configured to be connected to the sill. The second arm portion includes an outboard portion and an inboard portion. The outboard portion has a hook member engaging the sill opening to substantially prevent inboard movement of the second arm portion relative to the sill. The hook member extends downwardly from the outboard portion. The inboard portion is spaced from the sill.

Also other objects, features, aspects and advantages of the disclosed trim panel member will become apparent to those skilled in the art from the following detailed description, which, taken in conjunction with the annexed drawings, discloses exemplary embodiments of the trim panel member.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
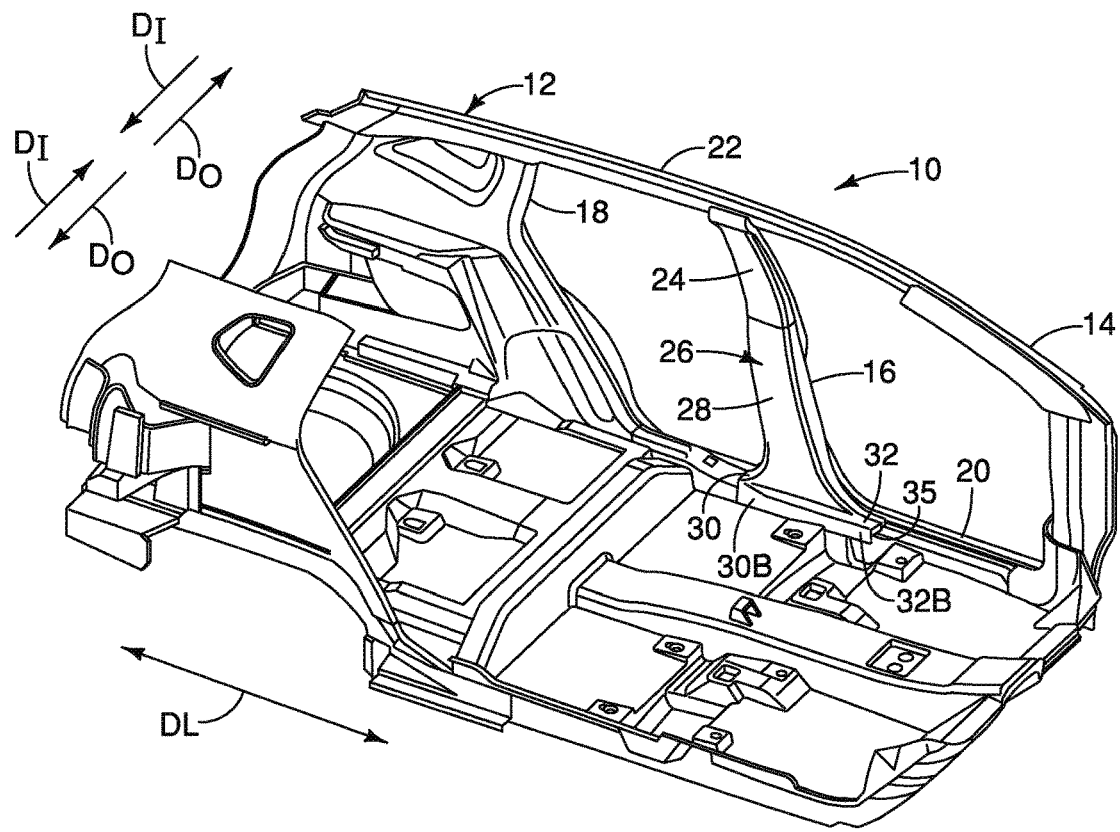
FIG. 1 is a partial perspective view of a vehicle body structure including a trim panel member in accordance with an exemplary embodiment of the present invention.

Referring initially to FIG. 1, a vehicle 10 having a vehicle body structure 12 is illustrated in accordance with an exemplary embodiment of the present invention. The vehicle includes many conventional features, such as suspension, steering, powertrain, electronic and passenger compartment components. Since these features and components are conventional features, further description is omitted for the sake of brevity.

As shown in FIG. 1, a plurality of differing directions is defined relative to the vehicle 10. Those directions include a vehicle longitudinal direction DL, a vehicle inboard direction DI, and a vehicle outboard direction DO. The vehicle inboard direction DI and the vehicle outboard direction DO are defined relative to an imaginary center line of the vehicle 10, where the imaginary center line extends in the vehicle longitudinal direction DL of the vehicle 10. Reference to inboard and outboard directions, inboard facing surfaces and outboard facing surfaces in the following description are with respect to the above listed vehicle defined directions.

As shown in FIGS. 1-7, the vehicle body structure 12 of the vehicle 10 includes many structural elements, many of them welded to one another. The vehicle frame structure 12 is shown in FIG. 1 with doors, drive train and interior components removed to provide greater clarity. The various structural elements, or members, of the vehicle body structure 12 define A-pillars 14, B-pillars 16, C-pillars 18, sills 20 and roof side rails 22. The sides of the vehicle frame structure 12 are generally symmetrical but otherwise identical. A portion of the right-side vehicle structure is omitted from FIG. 1 for clarity.

For the sake of brevity, a description of one side of the vehicle frame structure 12 is provided below. Specifically, the description below of one of the B-pillars 16 applies to both B-pillars 16.

The B-pillar 16, a first structural member, is dimensioned and shaped to extend between the sill 20 and the roof side rail 22, as shown in FIG. 1. The upper end of the B-pillar 16 is preferably welded to the roof side rail 22 of the vehicle frame structure 12. The lower end of the B-pillar is preferably welded to the sill 20 of the vehicle frame structure 12. A vehicle interior trim panel member typically attaches to a structural member within a vehicle passenger compartment. As shown in FIG. 1, an upper B-pillar trim panel member 24 and a lower B-pillar trim panel member 26 are shaped and configured to attach to and conceal the B-pillar 16 of the vehicle 10.

Figure 2:
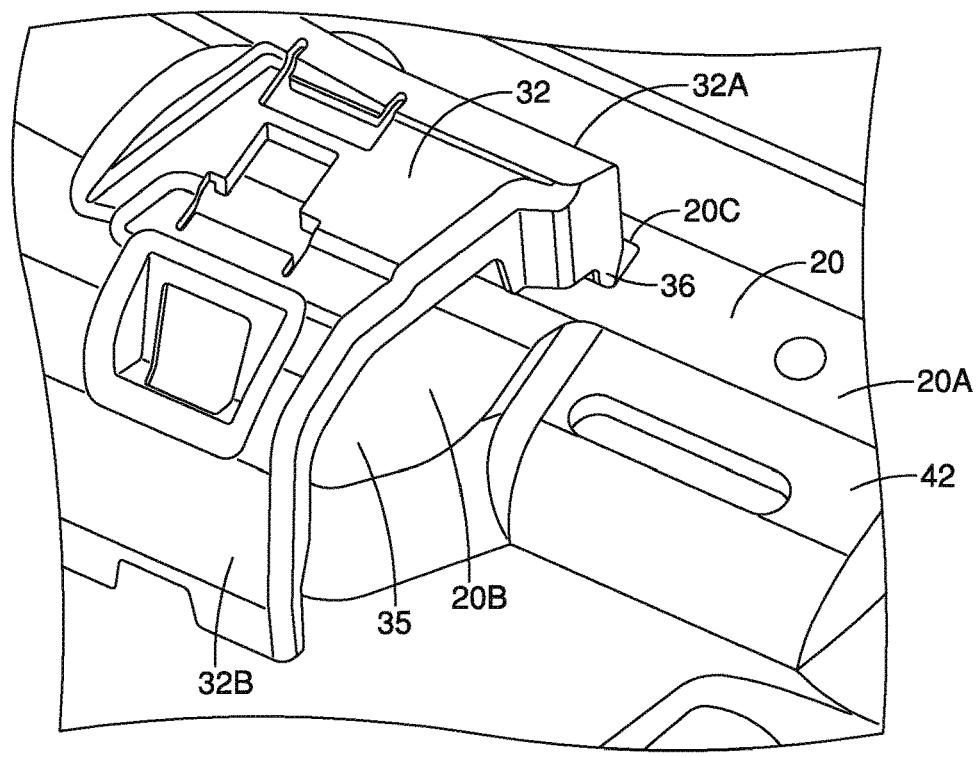
FIG. 2 is an enlarged perspective view of the trim panel member engaging a sill of the vehicle body structure of FIG. 1.
Figure 3:
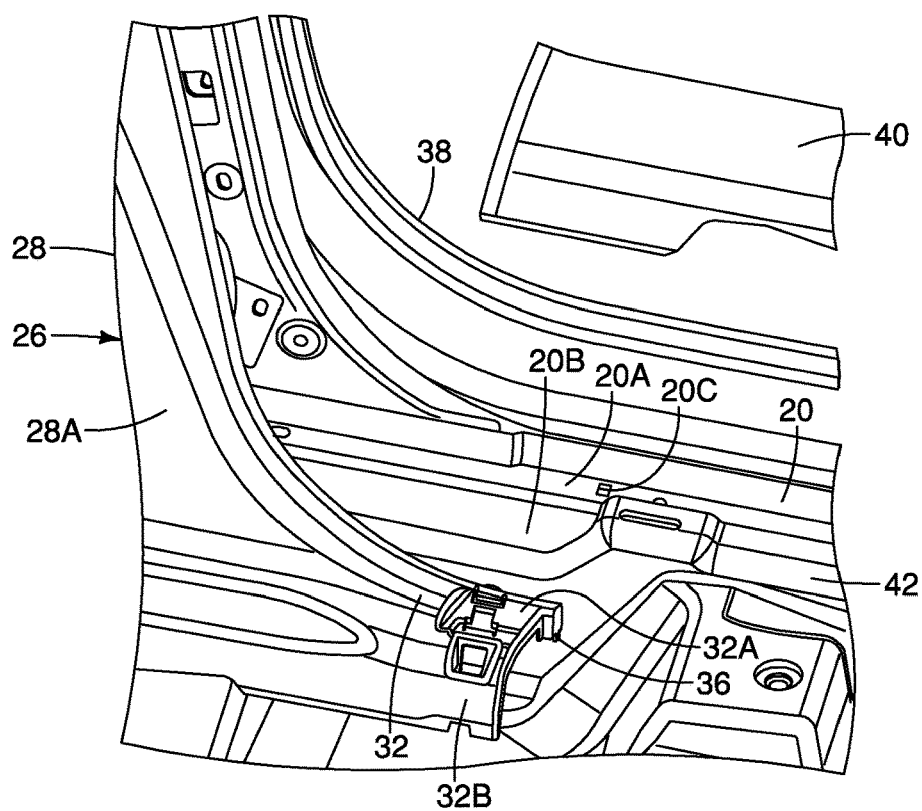
FIG. 3 is an exploded assembly view of the vehicle body structure of FIG. 2.

The sill 20, a second structural member, extends in the longitudinal direction DL of the vehicle 10, as shown in FIG. 1. The sill 20 includes an upper surface 20A and an inboard facing surface 20B, as shown in FIGS. 2 and 3. As shown in FIG. 2, the inboard facing surface 20B faces in an inboard direction DI of the vehicle 10. The inboard facing surface 20B extends downwardly from the upper surface 20A of the sill 20. An opening 20C is disposed in the upper surface 20A of the sill 20. The opening 20C extends entirely through the upper surface 20A of the sill 20. The opening 20C is disposed in the outboard direction DO from the inboard facing surface 20B of the sill 20.

As shown in FIGS. 1-7, the lower B-pillar trim panel member, or the trim panel member, 26 is connected to the B-pillar 16 and to the sill 20. Each of the B-pillars 16 of the vehicle structure 12 has a lower B-pillar trim panel member 26 attached thereto, although only the left-side trim panel member 26 is shown in FIG. 1. The B-pillars 16 and the trim panel members 26 are identical to one another, respectively, except that they are symmetrical mirror images of one another, being on opposite sides of the vehicle 10. Description of one of the trim panel members 26 applies equally to the trim panel member attached to the right-side B-pillar. Therefore, description of only one of the trim panel members 26 is provided below for the sake of brevity. Although described with reference to the B-pillar 16, the features of the present invention are equally applicable to any trim panel member connected to any structural pillar of the vehicle body structure 12.

The trim panel member 26 includes a body portion 28, a first arm portion 30 connected to the body portion 28 and extending in a first direction from the body portion 28, and a second arm portion 32 connected to the body portion 28 and extending in a second direction from the body portion 28. Preferably, the second direction is opposite the first direction. As shown in FIG. 1, the first direction is a rearward longitudinal direction DL of the vehicle 10, and the second direction is a forward longitudinal direction DL of the vehicle 10. The trim panel member 26 is preferably unitarily formed as a one-piece member. Preferably, the trim panel member 26 is made of a plastic material, such as polypropylene.

The body portion 28 is configured to be connected to a structural pillar, such as the B-pillar 26, of the vehicle body structure 12 of the vehicle 10, as shown in FIG. 1, in any suitable manner. The body portion 28 has an inboard facing surface 28A and an outboard facing surface 28B, as shown in FIGS. 8, 10, 12 and 14. The inboard facing surface 28A faces in the inboard direction DI toward a passenger compartment of the vehicle 10. The outboard facing surface 28B faces in the outboard direction DO toward an inboard surface of the B-pillar 16 to be concealed by the trim panel member 26. The outboard facing surface 28B has conventional features, such as projections 34, to facilitate connecting the body portion 28 of the trim panel member 26 to the B-pillar 16. The projections 34, and other structural connection features, are attached to the B-pillar 16 in an inboard-outboard direction.

The first arm portion 30 of the trim panel member 26 is configured to be connected to the sill 20 of the vehicle body structure 12 of the vehicle 10, as shown in FIG. 1. The first arm portion 30 has an outboard portion 30A and an inboard portion 30B, as shown in FIGS. 8, 10, 14 and 15. The outboard portion 30A is configured to engage the sill 20. The inboard portion 30B is spaced from the sill 20. The outboard portion 30A contacts the upper surface 20A of the sill 20. The inboard portion 30B of the first arm portion 30 of the trim panel member 26 is spaced from the inboard facing surface of the sill 20B.

Figure 4:
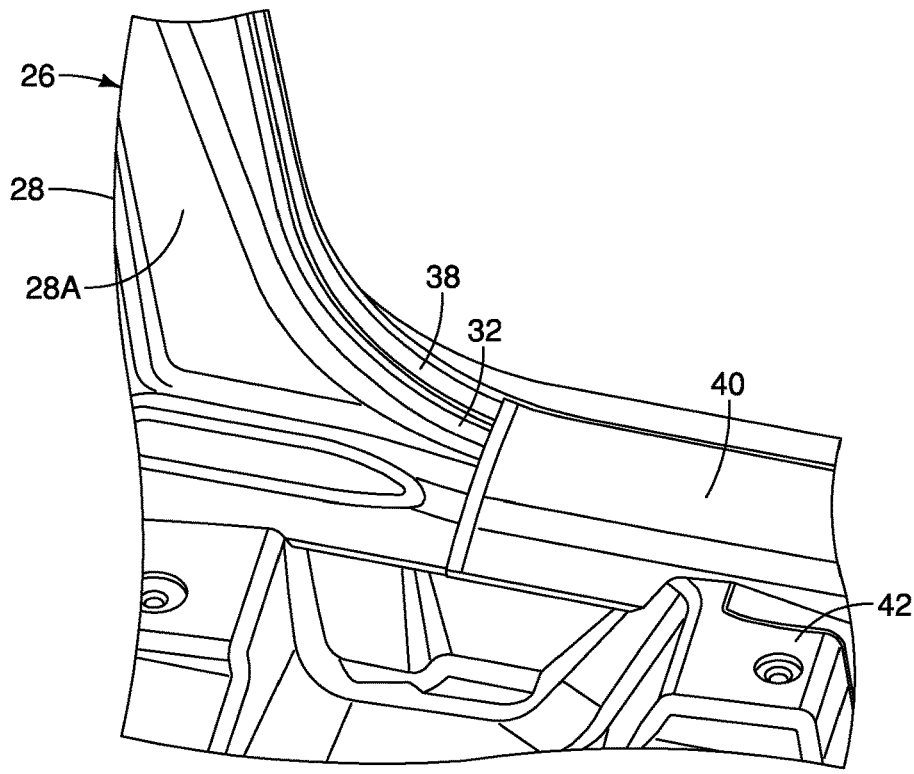
FIG. 4 is an assembled perspective view of the vehicle body structure of FIG. 2.
Figure 5:
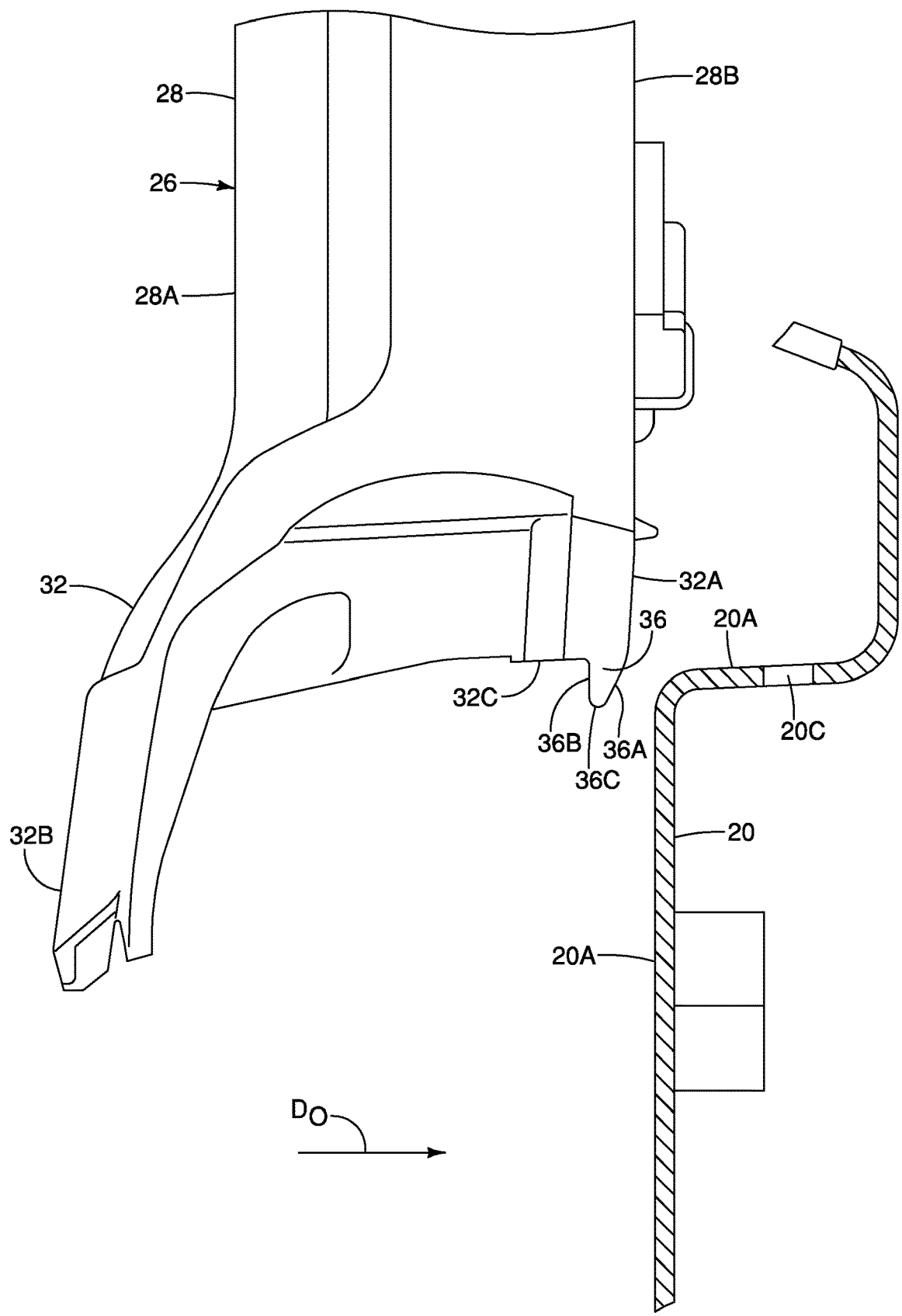
FIG. 5 is a rear elevational view in cross-section of the trim panel member prior to engagement with the sill.
Figure 6:
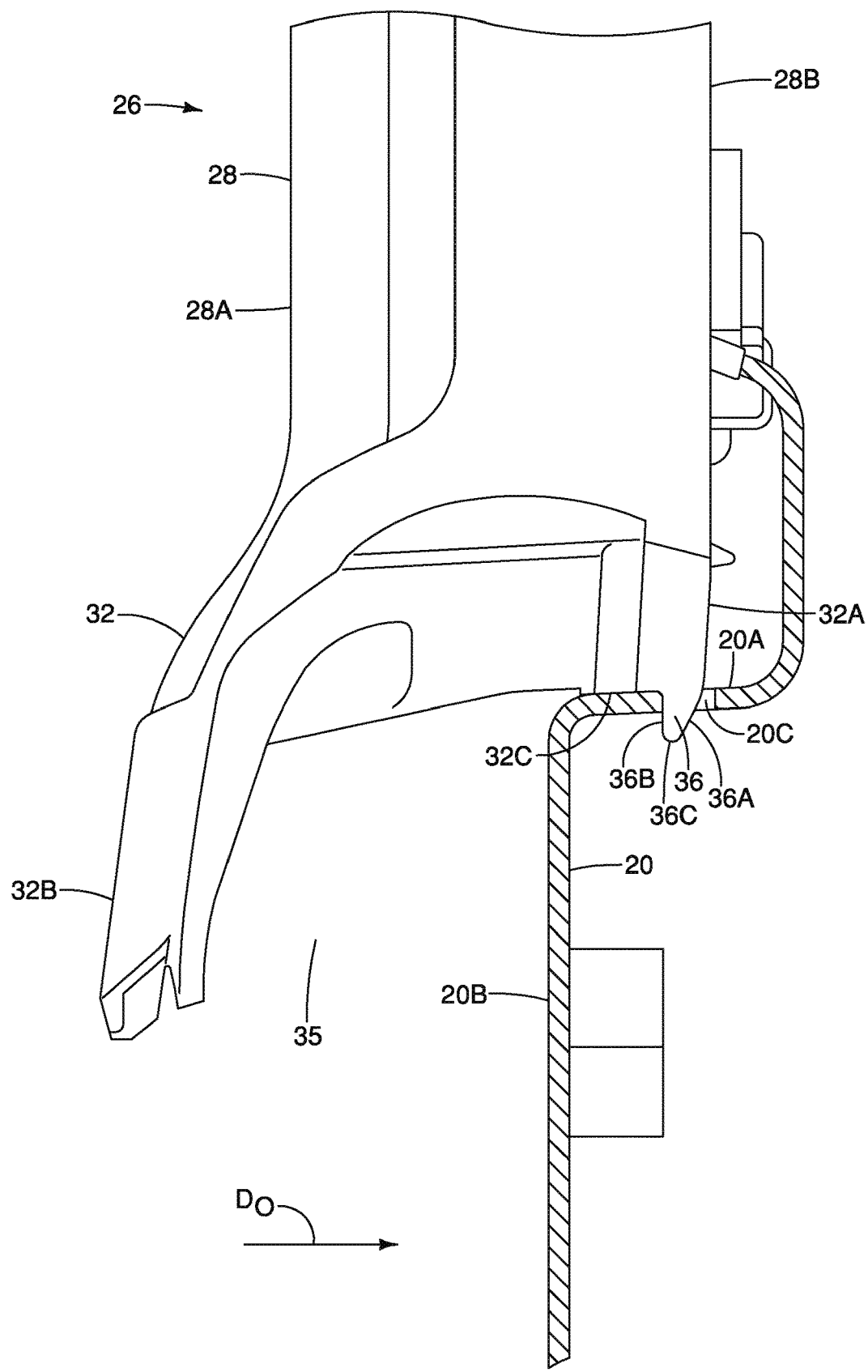
FIG. 6 is a rear elevational view in cross-section of the trim panel member engaged with the sill.
Figure 7:
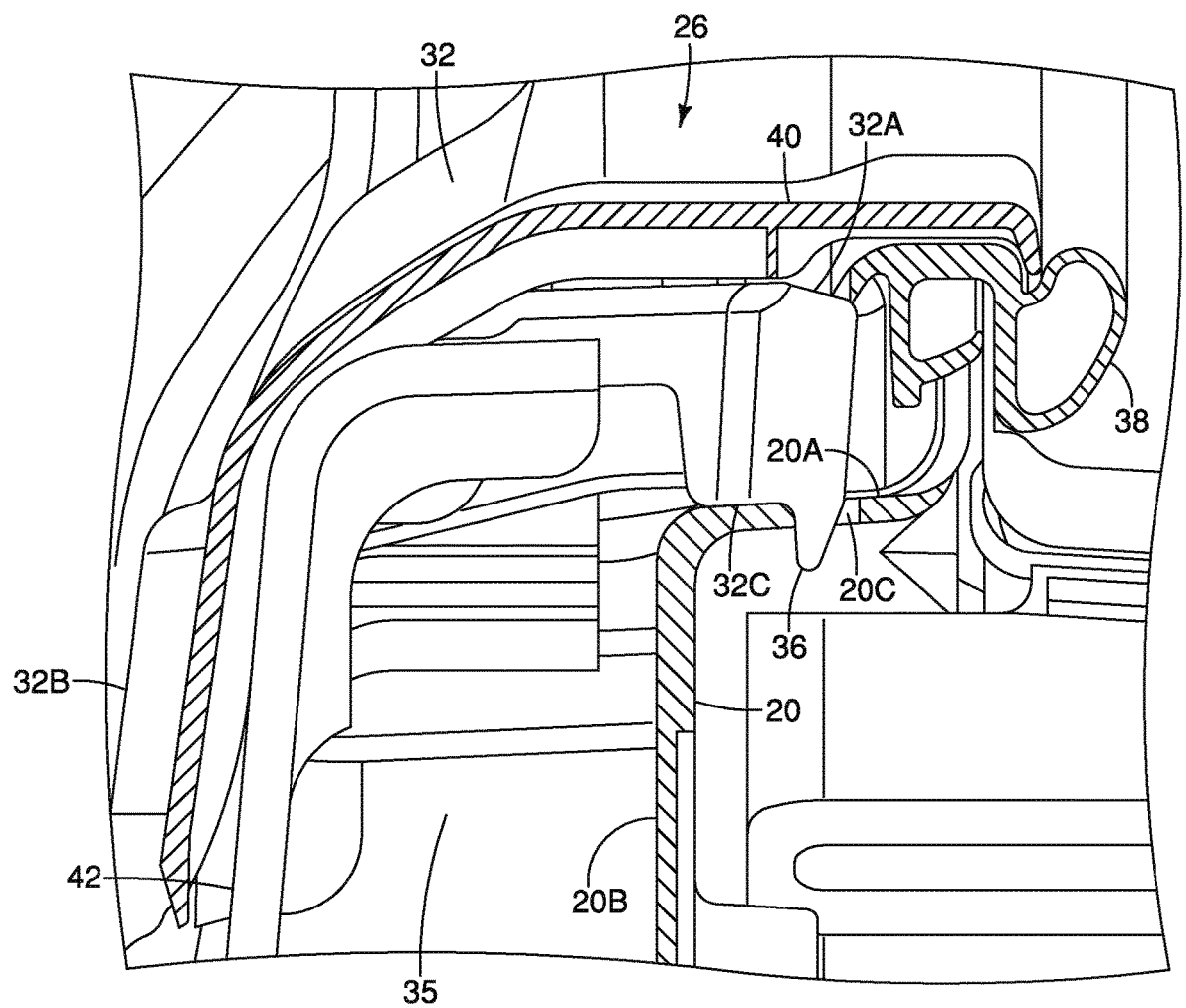
FIG. 7 is a rear elevational view in cross-section of the trim panel member engaged with the sill and a seal member and a kickplate installed.
Figure 8:
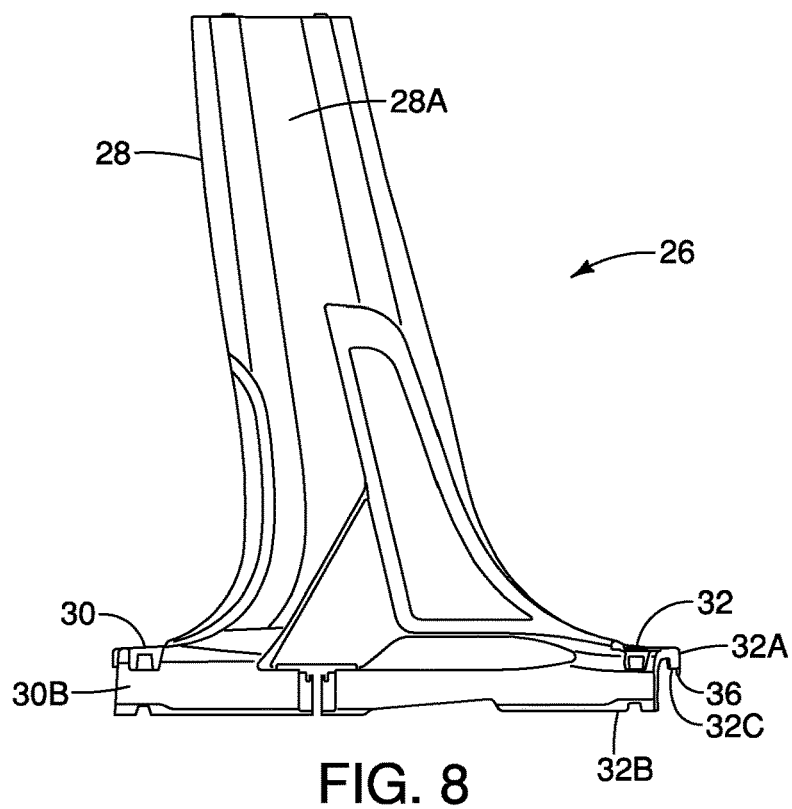
FIG. 8 is a front elevational view of the trim panel member of FIG. 1.
Figure 9:
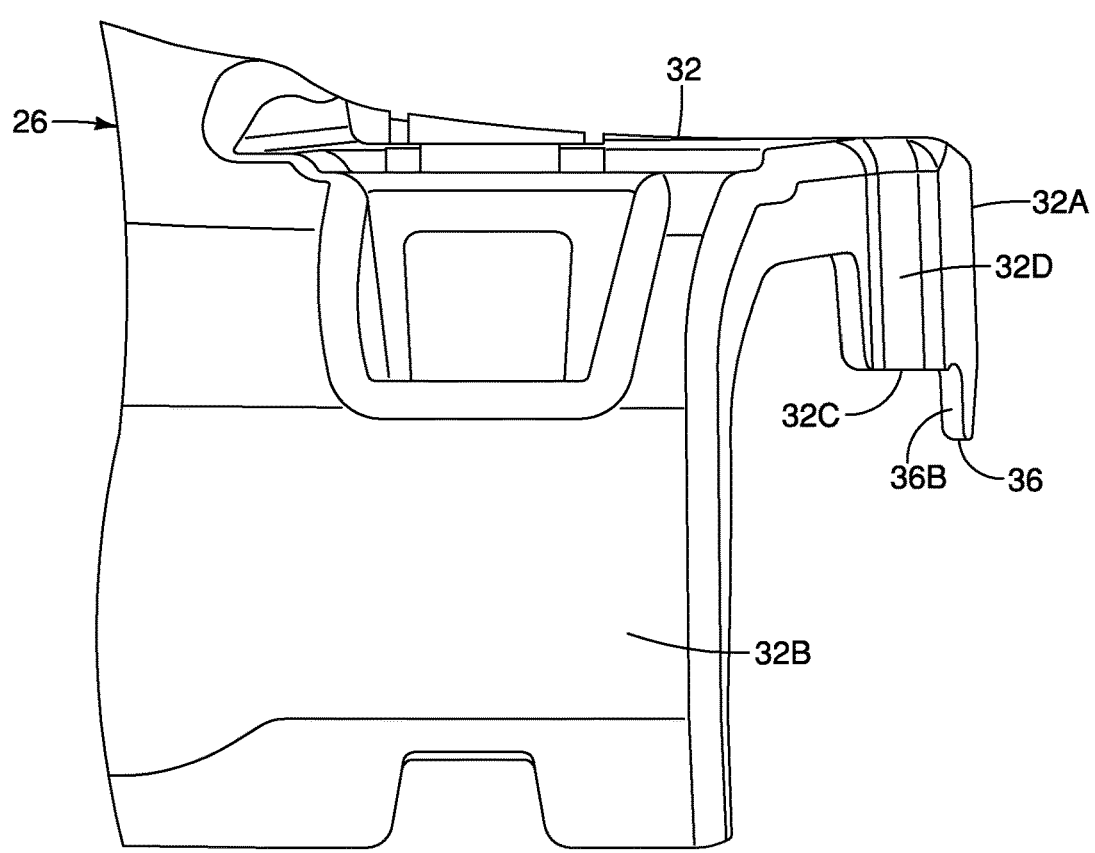
FIG. 9 is an enlarged front elevational view of a second arm portion of the trim panel member of FIG. 8.
Figure 10:
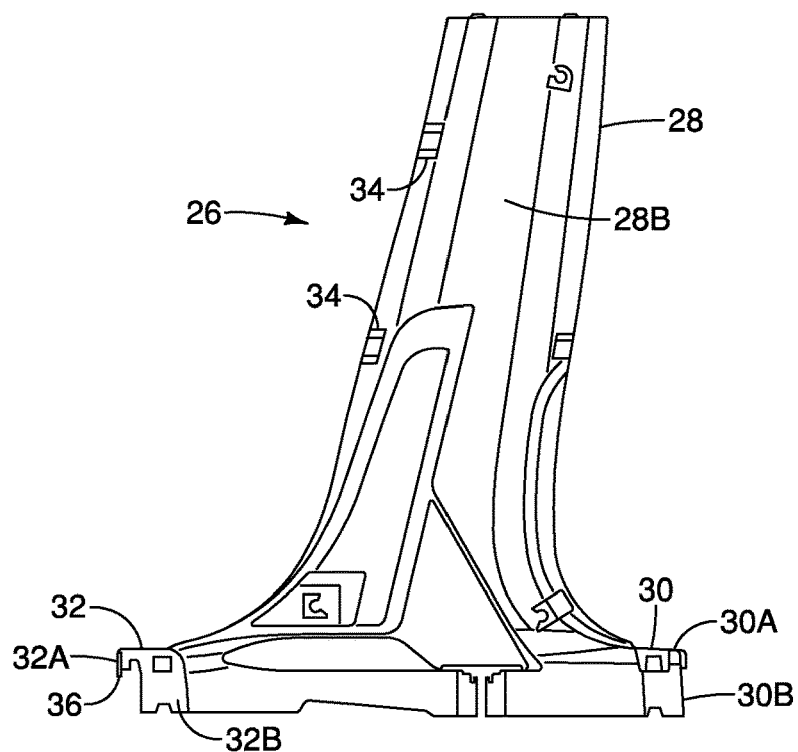
FIG. 10 is a rear elevational view of the trim panel member of FIG. 1.
Figure 11:
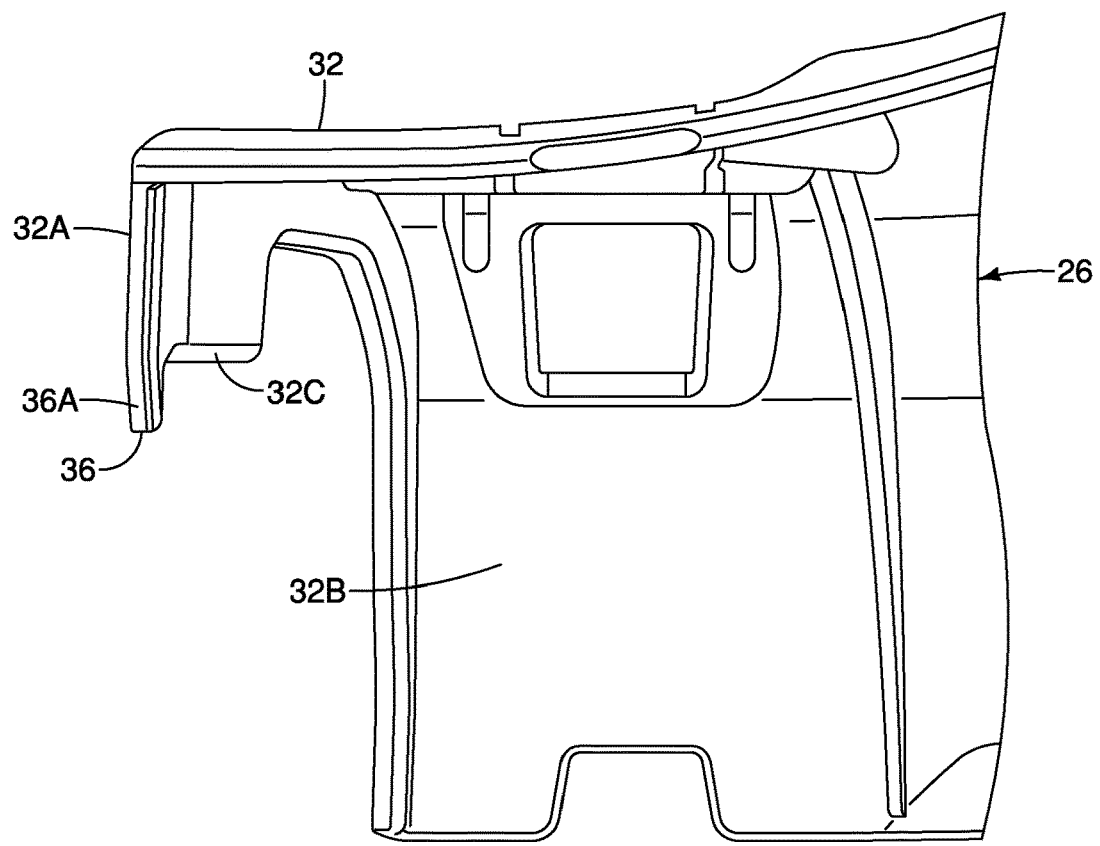
FIG. 11 is an enlarged rear elevational view of the second arm portion of the trim panel member of FIG. 10.
Figure 12:
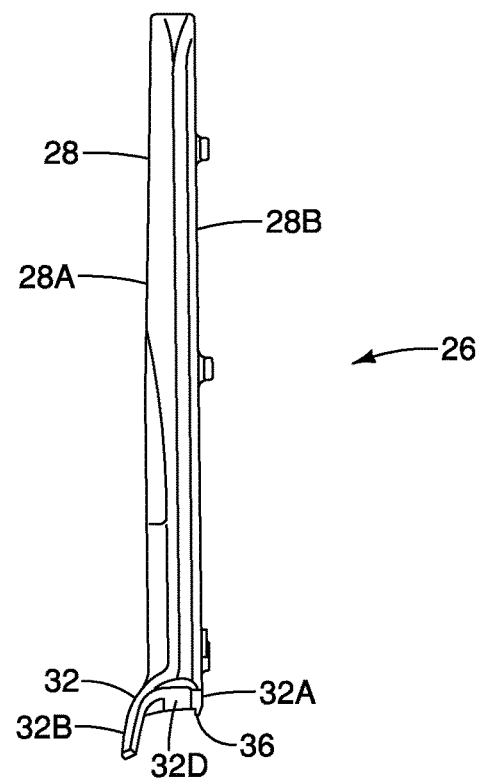
FIG. 12 is a side elevational view of the trim panel member of FIG. 1.

The second arm portion 32 of the trim panel member 26 is configured to be connected to the sill 20 of the vehicle body structure 12 of the vehicle 10, as shown in FIGS. 1-7. The second arm portion 32 has an outboard portion 32A and an inboard portion 32B. The outboard portion 32A is configured to engage the sill 20. The outboard portion 32A contacts the upper surface 20A of the sill 20. The inboard portion 32B of the second arm portion 32 is configured to be spaced from the sill 20 when the trim panel member 26 is connected to the vehicle body structure 12 of the vehicle 10. The inboard surface 32B of the trim panel member 26 is spaced from the inboard facing surface 20B of the sill, as shown in FIGS. 2, 6 and 7 when the trim panel member is connected to the sill 20 of the vehicle body structure 12.

As shown in FIGS. 1, 2, 6 and 7, a passage 35 is defined between the inboard facing surface 20A of the sill 20 and the outboard portions 30B and 32B of the first and second arm portions 30 and 32. The passage 35 allows electrical wires to conveniently be run along the floor of the vehicle while concealing the wires behind the trim panel member 26.

The outboard portion 32A has a hook member 36 configured to engage the sill 20, as shown in FIGS. 2 and 6. The hook member 36 extends downwardly from the outboard portion 32A of the first arm portion 30. As shown in FIGS. 5 and 6, the hook member 36 extends downwardly from a sill engaging surface 32C of the outboard portion 32 of the first arm portion 30 of the trim panel member 26. The sill engaging surface 32C contacts the upper surface 20A of the sill 20 when the hook member 36 is received by the sill opening 20C, as shown in FIGS. 6 and 7. The hook member 36 engages the sill opening 20C to substantially prevent inboard movement and rotational movement of the second arm portion 32 relative to the sill 20.

Figure 13:
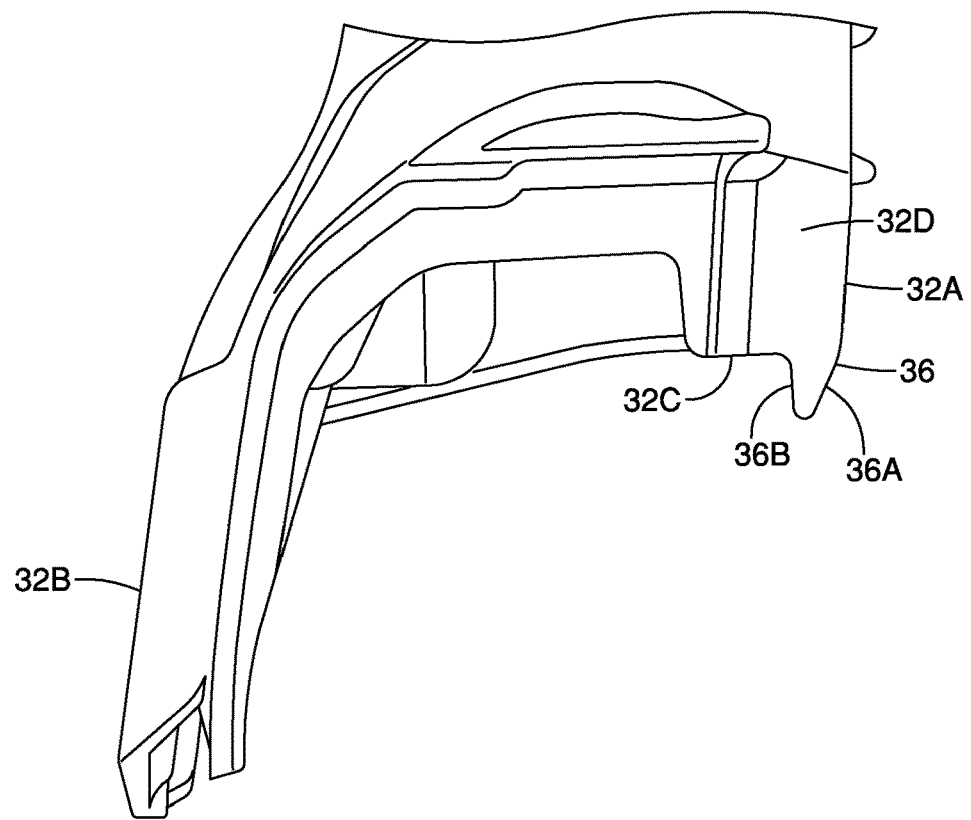
FIG. 13 is an enlarged side elevational view of the second arm portion of the trim panel member of FIG. 12.
Figure 14:
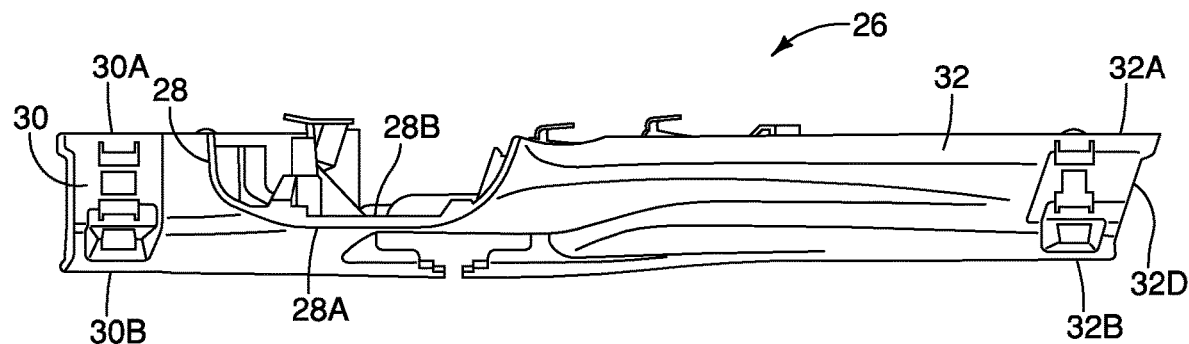
FIG. 14 is a top plan view of the trim panel member of FIG. 1.
Figure 15:
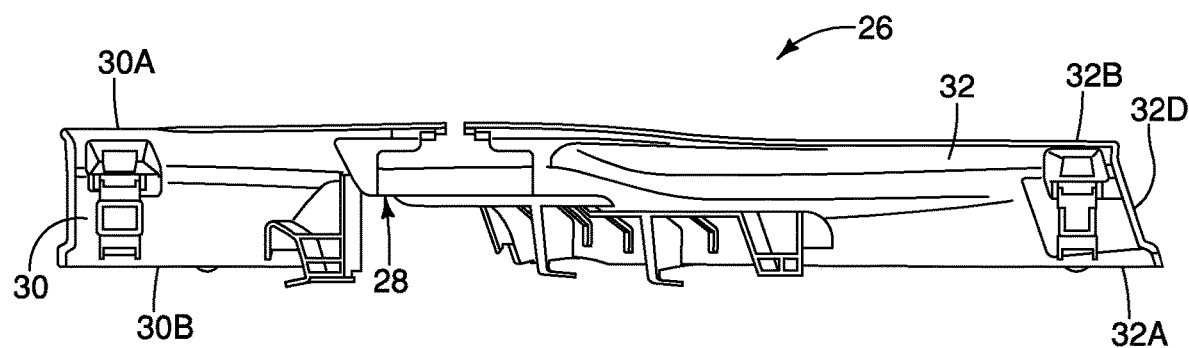
FIG. 15 is a bottom plan view of the trim panel member of FIG. 1.

The hook member 36 extends downwardly from the sill engaging surface 32C of the first arm portion 30 of the trim panel member, as shown in FIGS. 5-7, 9, 11 and 13. The hook member 36 has an outboard edge 36A and an inboard edge 36B. The outboard edge 36A extends downwardly from an outboard end of the sill engaging surface 32C. The outboard edge 36A preferably slopes in an inboard direction. The inboard edge 36B of the hook member 36 extends downwardly from a position of the sill engaging surface 32C disposed in an inboard direction from the outboard end of the sill engaging surface 32C. As shown in FIGS. 8, 9, 12 and 13, the hook member 36 is disposed at a forward end 32D of the first arm portion 30 of the trim panel member 26. As shown in FIGS. 5 and 13, a free end 36C of the hook member 36 is preferably rounded to facilitate installation of the second arm portion 32 of the trim panel member 26.

Installation of the trim panel member 26 is shown in FIGS. 5, 6 and 7. The trim panel 26 is moved in an outboard direction from an inboard side of the sill 20. In other words, the outboard portion 32A of the second arm portion 32 of the trim panel member 26 is moved in the outboard direction DO to engage the hook member 36 with the sill opening 20C during installation of the trim panel member 26. The outboard edge 36A of the hook member 36 contacts the inboard facing surface 20A of the sill 20. The outboard edge 36A sloping in the inboard direction and the rounded free end 36C of the hook member 36 facilitates the hook member 36 sliding along the upper surface 20A of the sill 20. The trim panel member 20 is continued to be moved in the outboard direction DO such that the hook member 36 slides along the upper surface 20A of the sill 20 until the hook member 36 engages the sill opening 20C, as shown in FIGS. 6 and 7. The hook member 36 moves in a downward direction to engage the sill opening 20C in the supper surface 20A of the sill 20 during installation of the trim panel member 26. The inboard edge 36B of the hook member 36 contacts an inboard portion of the sill opening 20C to prevent movement of the first arm portion 30 of the trim panel member 26 in the inboard direction. The sill contacting surface 32C contacts the upper surface 20A of the sill 20, in addition to the inboard edge 36B of the hook member contacting the inboard portion of the sill opening 20C, to substantially prevent rotational movement of the trim panel member 26 with respect to the sill 20.

As shown in FIG. 3, a seal member 38 and kickplate 40 are installed after the trim panel member 26 is installed. As shown in FIG. 3, the floor carpet 42 is installed prior to installation of the trim panel member 26. The hook member 36 engages the sill opening 20C to prevent inboard movement of the second arm portion 32 of the trim panel member 26 during installation of the seal member 38, thereby providing a proper installation of the seal member 38. After the seal member 38 is installed, the kickplate 40 is installed to securely retain the seal member 38 to the sill 20, as shown in FIG. 4. The hook member 36 of the trim panel member 26 engaging the sill opening 20C substantially prevents inboard movement and rotational movement of the second arm portion 32 of the trim panel member 26 during installation of the seal member 38 and the kickplate 40, as shown in FIGS. 4 and 7.

Although the above description of the exemplary embodiment of the present invention describes the trim panel member 26 connected to the B-pillar 16 and to the sill 20, the present invention is not so limited. For example, the trim panel member can be an A-pillar lower trim panel member configured to be connected to a front door step inner panel, which overlie the sheet metal sill. The trim panel member can be a C-pillar lower trim panel member configured to be connected to a rear door step inner panel, which overlie the sheet metal sill. The trim panel member can be a lower trim panel member configured to be connected to a sill panel in a cargo area of the vehicle, which overlie a sheet metal disposed at a trunk opening. A trim panel member can be connected to other structural members of the vehicle without departing from the scope of invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the trim panel member for a vehicle. Accordingly, these terms, as utilized to describe the present invention should be interpreted relative to a vehicle equipped with the trim panel member for a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A trim panel member for a vehicle, comprising:
   a body portion configured to be connected to a first structural member of the vehicle;
   a first arm portion connected to the body portion and extending in a first direction from the body portion; and
   a second arm portion connected to the body portion and extending in a second direction from the body portion, the second body portion being configured to be connected to a second structural member of the vehicle, the second arm portion including an outboard portion having a hook member configured to engage the second structural member, the hook member extending downwardly from the outboard portion, and an inboard portion configured to be spaced from the second structural member when the trim panel member is connected to the vehicle.

2. The according to claim 1, wherein the trim panel member is unitarily formed as a one-piece member.

3. The according to claim 1, wherein the trim panel member is made of a plastic material.

4. The according to claim 1, wherein an outboard edge of the hook member slopes in an inboard direction.

5. The according to claim 1, wherein the hook member is disposed at a forward end of the second arm portion.

6. The according to claim 1, wherein the first structural member is a B-pillar and the second structural member is a sill.

7. A vehicle body structure, comprising:

a structural pillar;

a sill connected to the structural pillar, the sill having an opening;

a trim panel member connected to the structural pillar and to the sill, the trim panel member including a body portion connected to the structural pillar;

a first arm portion connected to the body portion and extending in a first direction from the body portion; and a second arm portion connected to the body portion and extending in a second direction from the body portion, the second body portion being configured to be connected to the sill, the second arm portion including an outboard portion having a hook member engaging the sill opening to substantially prevent inboard movement of the second arm portion relative to the sill, the hook member extending downwardly from the outboard portion, and an inboard portion spaced from the sill.

8. The vehicle body structure according to claim 7, wherein the trim panel member is unitarily formed as a one-piece member.

9. The vehicle body structure according to claim 7, wherein the trim panel member is made of a plastic material.

10. The vehicle body structure according to claim 7, wherein the sill opening is disposed in an upper surface of the sill.

11. The vehicle body structure according to claim 10, wherein the hook member extends downwardly from a sill engaging surface of the outboard portion, the sill engaging surface contacting the upper surface of the sill.

12. The vehicle body structure according to claim 7, wherein an outboard edge of the hook member slopes in an inboard direction.

13. The vehicle body structure according to claim 12, wherein the outboard portion of the second arm portion of the trim panel member is moved in an outboard direction to engage the hook member with the sill opening during installation of the trim panel member.

14. The vehicle body structure according to claim 13, wherein the hook member moves in a downward direction to engage the sill opening in the upper surface of the sill during installation of the trim panel member.

15. The vehicle body structure according to claim 7, wherein an inboard portion of the first arm portion and the inboard portion of the second arm portion are spaced from an inboard facing surface of the sill to form a passage therebetween.

16. The vehicle body structure according to claim 15, wherein the sill opening is disposed in an outboard direction from the inboard facing surface of the sill.

17. The vehicle body structure according to claim 7, wherein the hook member is disposed at a forward end of the second arm portion of the trim panel member.

18. The vehicle body structure according to claim 7, wherein the hook member engages the sill opening to prevent inboard movement of the second arm portion of the trim panel member during installation of a seal member.

19. The vehicle body structure according to claim 7, wherein a free end of the hook member is rounded to facilitate installation of the second arm portion of the trim panel member.

20. The vehicle body structure according to claim 7, wherein the structural pillar is a B pillar.

* * * * *